US009327512B2

(12) United States Patent
Van Brocklin et al.

(10) Patent No.: US 9,327,512 B2
(45) Date of Patent: May 3, 2016

(54) INKJET PRINTHEAD DEVICE, FLUID EJECTION DEVICE, AND METHOD THEREOF

(75) Inventors: Andrew L Van Brocklin, Corvallis, OR (US); Adam L Ghozeil, Corvallis, OR (US); Daryl E Anderson, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 14/125,660

(22) PCT Filed: Oct. 24, 2011

(86) PCT No.: PCT/US2011/057515
§ 371 (c)(1),
(2), (4) Date: Dec. 12, 2013

(87) PCT Pub. No.: WO2013/062518
PCT Pub. Date: May 2, 2013

(65) Prior Publication Data
US 2014/0118435 A1    May 1, 2014

(51) Int. Cl.
*B41J 2/015* (2006.01)
*B41J 2/175* (2006.01)
*B41J 2/045* (2006.01)
*B41J 2/14* (2006.01)
*G01F 23/18* (2006.01)

(52) U.S. Cl.
CPC .......... *B41J 2/17566* (2013.01); *B41J 2/0451* (2013.01); *B41J 2/0458* (2013.01); *B41J 2/14153* (2013.01); *G01F 23/185* (2013.01); *B41J 2202/07* (2013.01)

(58) Field of Classification Search
USPC .............. 347/20, 48, 68, 70, 19, 5, 10, 14
See application file for complete search history.

(56) References Cited

U.S. PATENT DOCUMENTS

| 6,688,729 | B1* | 2/2004 | Imanaka et al. ................. 347/48 |
| 7,597,417 | B2* | 10/2009 | Nagashima ............ B41J 2/0451 |
| | | | 347/19 |
| 7,988,265 | B2 | 8/2011 | Smith |
| 2004/0223021 | A1 | 11/2004 | Farr et al. |
| 2005/0195248 | A1* | 9/2005 | Nagashima ..................... 347/68 |

(Continued)

FOREIGN PATENT DOCUMENTS

| EP | 1057641 A2 | 12/2000 |
| EP | 1690686 A1 | 8/2006 |

(Continued)

OTHER PUBLICATIONS

PCT Search Report/Written Opinion ~ Application No. PCT/US2011/057515 dated Jul. 16, 2012 ~ 9 pages.

*Primary Examiner* — Lam Nguyen
(74) *Attorney, Agent, or Firm* — HP Inc. Patent Department (57) ABSTRACT

An inkjet printhead device, fluid ejection device and method thereof are disclosed. The fluid ejection device includes a fluid supply chamber to store fluid, an ejection chamber including a nozzle and a corresponding ejection member to selectively eject the fluid through the nozzle, and a channel to establish fluid communication between the fluid supply chamber and the ejection chamber. The fluid ejection device also includes a pressure sensor unit having a sensor plate to output a voltage value corresponding to a cross-sectional area of an amount of fluid in the at least ejection chamber.

16 Claims, 10 Drawing Sheets

(56) References Cited

U.S. PATENT DOCUMENTS

| | | |
|---|---|---|
| 2006/0268046 A1* | 11/2006 | Ootsuka .................. 347/20 |
| 2007/0040860 A1 | 2/2007 | Chou et al. |
| 2007/0153032 A1 | 7/2007 | Chou et al. |
| 2010/0302323 A1* | 12/2010 | Yagi et al. ................ 347/70 |

FOREIGN PATENT DOCUMENTS

| | | |
|---|---|---|
| JP | 03275360 A | 12/1991 |
| JP | H03-284953 | 12/1991 |
| JP | H04-041251 | 2/1992 |
| JP | H05-008407 | 1/1993 |
| JP | 06218944 A | 8/1994 |
| JP | H09-286118 | 11/1997 |
| JP | H11-129472 | 5/1999 |
| JP | 2001-138519 | 5/2001 |
| JP | 2001-315363 | 11/2001 |
| JP | 2001-322298 | 11/2001 |
| JP | 2004-082742 | 3/2004 |
| JP | 2007-076326 | 3/2007 |
| JP | 2007-185804 | 7/2007 |
| JP | 2007-203649 | 8/2007 |
| JP | 2007237705 A | 9/2007 |
| JP | 2008-149594 | 7/2008 |

* cited by examiner

INKJET PRINTHEAD DEVICE, FLUID EJECTION DEVICE, AND METHOD THEREOF

CROSS REFERENCE TO RELATED APPLICATIONS

This application is a national stage application under 35 U.S.C. §371 of PCT/US2011/057515, filed Oct. 24, 2011, which is incorporated herein by reference in its entirety.

This application is related to commonly-owned patent application Ser. Nos. PCT/US2011/057509, entitled "INKJET PRINTING SYSTEM, FLUID EJECTION SYSTEM, AND METHOD THEREOF" and filed contemporaneously herewith by Andrew L. Van Brocklin, Adam L. Ghozeil, and Daryl E. Anderson; PCT/US2011/057506, entitled "FLUID EJECTION DEVICES AND METHODS THEREOF" and filed contemporaneously herewith by Andrew L. Van Brocklin, Adam L. Ghozeil, and Daryl E. Anderson; and PCT/US2011/057488, entitled "FLUID EJECTION SYSTEMS AND METHODS THEREOF" and filed contemporaneously herewith by Adam L. Ghozeil, Daryl E. Anderson, and Andrew L. Van Brocklin; and which related applications are incorporated herein by reference in their entirety.

BACKGROUND

Fluid ejection devices provide fluid onto objects. The fluid ejection devices may include a fluid supply chamber to store fluid. The fluid ejection devices may also include a plurality of ejection chambers including nozzles and corresponding ejection members to selectively eject the fluid through the respective nozzles. The fluid ejection devices may include inkjet printhead devices to print images in a form of ink onto media.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

In the following detailed description, reference is made to the accompanying drawings which form a part hereof, and in which is depicted by way of illustration specific examples in which the present disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims.

Fluid ejection devices provide fluid onto objects. The fluid ejection devices may include a fluid supply chamber to store fluid. The fluid ejection devices may also include a plurality of ejection chambers including nozzles and corresponding ejection members to selectively eject the fluid through the respective nozzles. The fluid ejection devices may include inkjet printhead devices to print images in a form of ink onto media. An amount of fluid remaining in the fluid ejection device may impact and/or be indicative of the ability of the fluid ejection device to adequately provide the fluid onto the objects. Whether fluid remains in the fluid ejection device, for example, may be detected and/or determined by counting fluid drops ejected from the fluid ejection device, physically detecting fluid drops ejected from the fluid ejection device, and examining media for the presence or absence of fluid drops ejected from the fluid ejection device. Statistical calculations may also be used to determine when the fluid is nearing running out. Generally, however, such detections and/or determinations may not be able to and/or have limited accuracy to determine an amount of fluid in the fluid ejector device.

Examples of the present disclosure include an inkjet printhead device, a fluid ejection device and method thereof. In examples, the fluid ejection device includes a pressure sensor unit. The pressure sensor unit includes as sensor plate to output a voltage value corresponding to a cross-sectional area of an amount of fluid in at least one ejection chamber. For example, the at least one ejection chamber may correspond to a test chamber that may include the sensor plate. The voltage value output by the pressure sensor unit may change in proportion to the change in back pressure within the fluid ejection device. That is, an amount of fluid and/or a condition in the fluid ejection device may be more accurately determined at least due to the range of voltage values output by the pressure sensor unit corresponding to the back pressure range.

Figure 1:
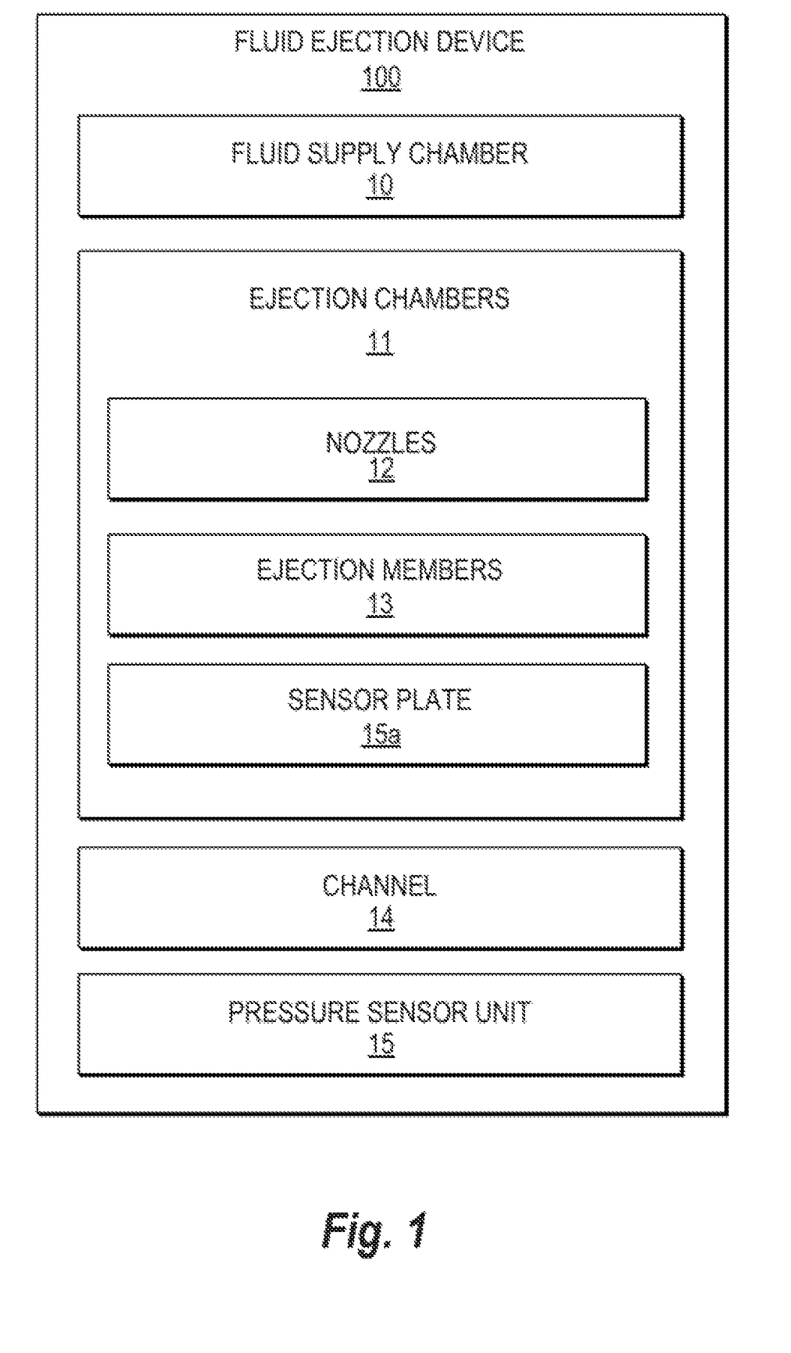
FIG. 1 is a block diagram illustrating a fluid ejection device according to an example.

FIG. 1 is a block diagram illustrating a fluid ejection device according to an example. Referring to FIG. 1, in some examples, a fluid ejection device 100 includes a fluid supply chamber 10, a plurality of ejection chambers 11, a channel 14, and a pressure sensor unit 15. The fluid supply chamber 10 may store fluid. The channel 14 may establish fluid communication between the fluid supply chamber 10 and the ejection chambers 11. That is, fluid may be transported through the channel 14 from the fluid supply chamber 10 to the ejection chambers 11. In some embodiments, the channel 14 may be in a form of a single channel such as a fluid slot. Alternatively, the channel 14 may be in a form of a plurality of channels. The ejection chambers 11 may include nozzles 12 and corresponding ejection members 13 to selectively eject the fluid through the respective nozzles 12.

Figure 5:
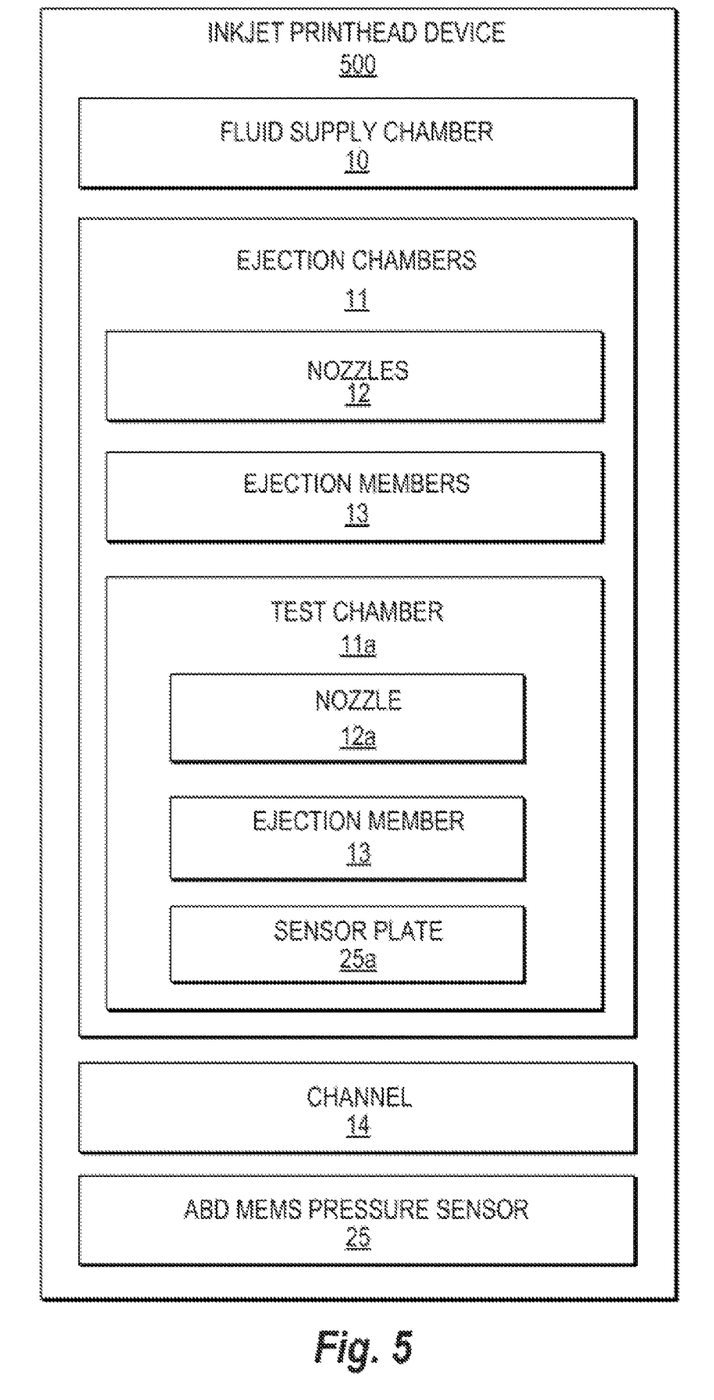
FIG. 5 is a block diagram illustrating an inkjet printhead device according to an example.

Referring to FIG. 1, the pressure sensor unit 15 may include a sensor plate 15a to output a voltage value corresponding to a cross-sectional area 39 (FIG. 3) of an amount of fluid in the at least one ejection chamber 11. In some examples, the sensor plate 15a may be disposed in the at least one ejection chamber 11, channel 14, or the like. For example, the sensor plate 15a may be disposed in the at least one ejection chamber 11. The sensor plate 15a may be a metal sensor plate formed, for example, of tantalum, or the like. In some examples, the pressure sensor unit 15 may include a plurality of sensor plates 15a corresponding to a number of ejection chambers 11. Alternatively, the fluid ejection device 100 may include a plurality of pressure sensor units 15 and each one having a respective sensor plate 15a disposed in a respective ejection chamber 11. In some examples, the fluid ejection device 100 may be an inkjet printhead device 500 (FIG. 5).

Figure 2:
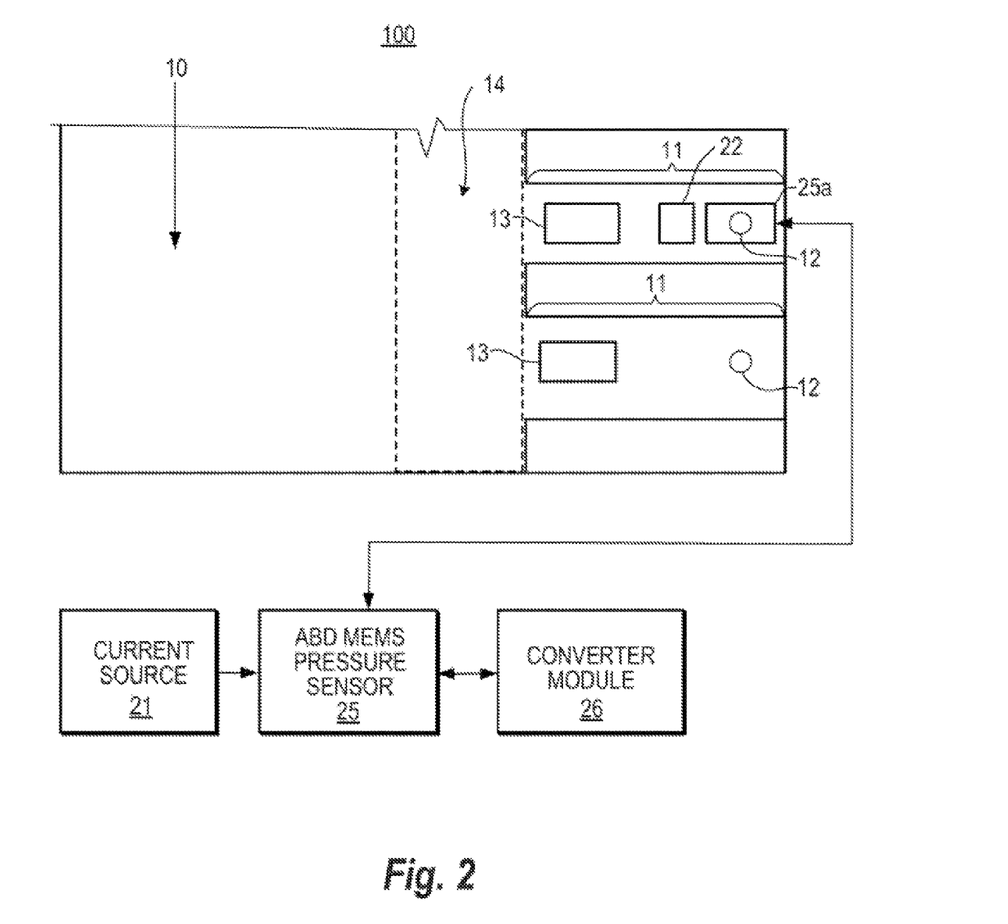
FIG. 2 is a schematic top view of a portion of the fluid ejection device of FIG. 1 according to an example.
Figure 3:
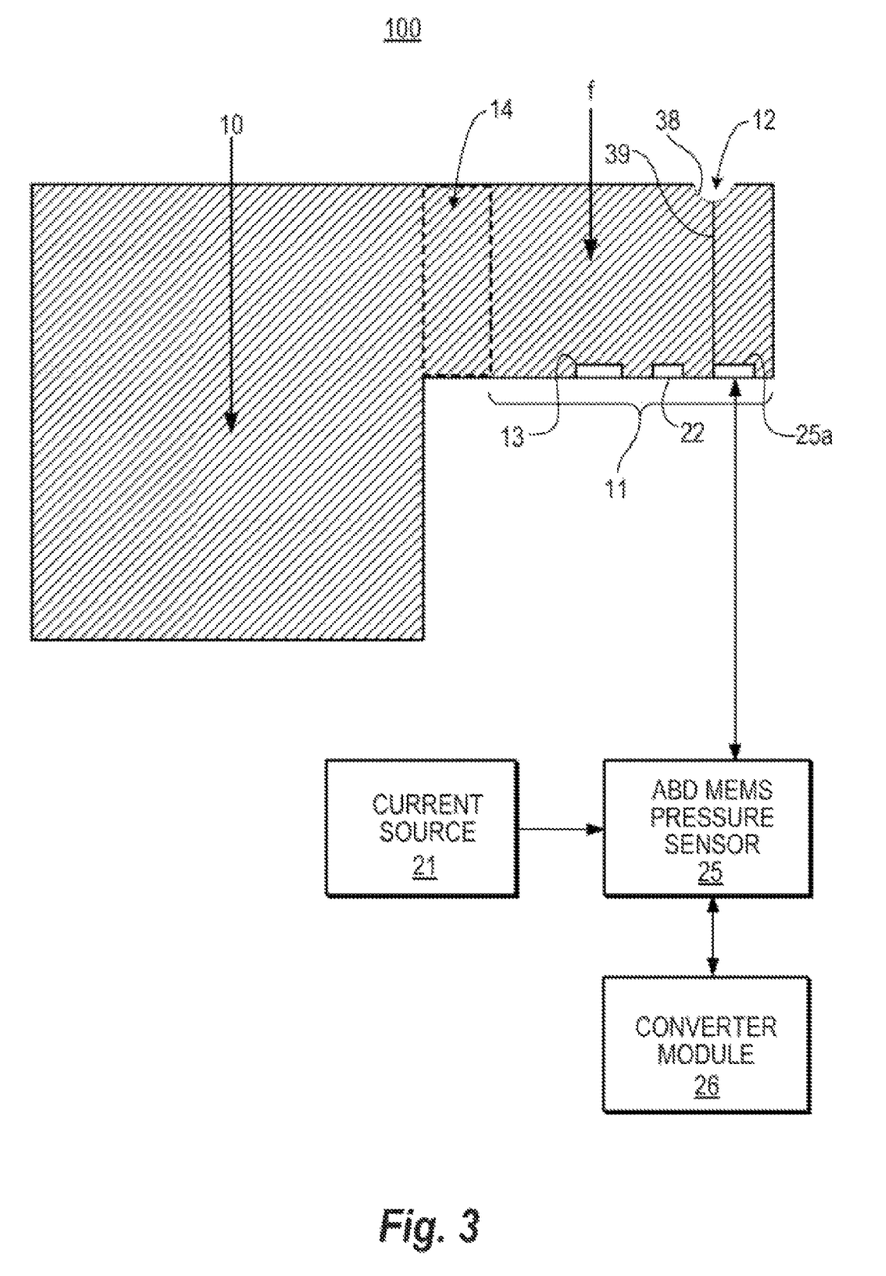
FIG. 3 is a schematic cross-sectional view of the fluid ejection device of FIG. 2 according to an example.

FIG. 2 is a schematic top view of a portion of the fluid ejection device of FIG. 1 according to an example. FIG. 3 is a schematic cross-sectional view of the fluid ejection device of FIG. 2 according to an example. Referring to FIGS. 2 and 3, in some examples, the fluid ejection device 100 includes a fluid supply chamber 10, a plurality of ejection chambers 11, a channel 14, a pressure sensor unit 15 in a form of an air bubble detect micro-electro-mechanical systems (ABD MEMS) pressure sensor 25 having a sensor plate 25a, a current source 21, a grounding member 22, and a converter module 26. In some examples, the pressure sensor unit 25 may include the grounding member 22 and/or the current source 21.

During a printing operation, for example, a fluid drop may be ejected from a respective ejection chamber 11 through a corresponding nozzle 12. The ejection chamber 11 may then be refilled with fluid f from the fluid supply chamber 10 through the channel 14. For example, an electrical current signal may be provided to an ejection member 13 such as a firing resistor to emit heat there from. Fluid proximate to the firing resistor may be superheated and vaporize resulting in a vapor bubble being formed in the corresponding ejection chamber 11. The expansion of the vapor bubble may force a fluid drop out of the corresponding nozzle 12. In response to the coding of the firing resistor, the vapor bubble may collapse. As a result, fluid f from the channel 14 may be supplied to the ejection chamber in preparation to eject another fluid drop through the respective nozzles 12.

Referring to FIG. 3, in some examples, back pressure may change the position of fluid f in the ejection chamber 11 of the fluid ejection device 100. For example, a meniscus 38 of the fluid f may move an inward direction away from the respective nozzle 12 and change a cross-sectional area 39 of an amount of the fluid f in the ejection chamber 11 in response to a change of back pressure therein. In some examples, the cross-sectional area 39 of the fluid f may include a height extending from a sensor plate 25a disposed in the ejection channel 11 to the meniscus 38 of the fluid f. Referring to FIGS. 2 and 3, during a detection operation, the respective sensor plate 25a of the ABD MEMS pressure sensor 25 may receive an electrical current signal from the current source 21.

The electrical current signal may be transmitted from the respective sensor plate 25a to a grounding member 22 by passing through fluid f disposed there between. The grounding member 22, for example, may be in the fluid chamber 10, channel 14, respective ejection chamber 11, or the like. For example, the grounding member 22 may be disposed in the respective ejection chamber 11 in a form of a cavitation member and/or cavitation layer. In some examples, the ABD MEMS pressure sensor unit 25 may include the grounding member 22 and/or the current source 21. The ABD MEMS pressure sensor 25 may output voltage values as a function of a back pressure within the at least one ejection chamber 11. For example, the ABD MEMS pressure sensor 25 may output voltage values through the sensor plate 25a.

Referring to FIGS. 2 and 3, in some examples, the converter module 26 may output a count value corresponding to the respective voltage value of the fluid f output by the respective ABD MEMS pressure sensor 25. For example, the converter module 26 may associate a unique number to correspond to each range each range of voltage values of respective ranges. Additionally, the unique numbers may be selected to correspond to the order of the corresponding ranges. That is, a range including higher voltage values will be associated with a higher number than a range including lower voltage values. In some examples, the fluid ejection device 100 may include a plurality of convertor modules 26 corresponding to the number of sensor plates 25a and/or ABD MEMS pressure sensors 25. In some examples, the fluid ejection device 100 may be an inkjet printhead device 500 (FIG. 5).

Figure 4:
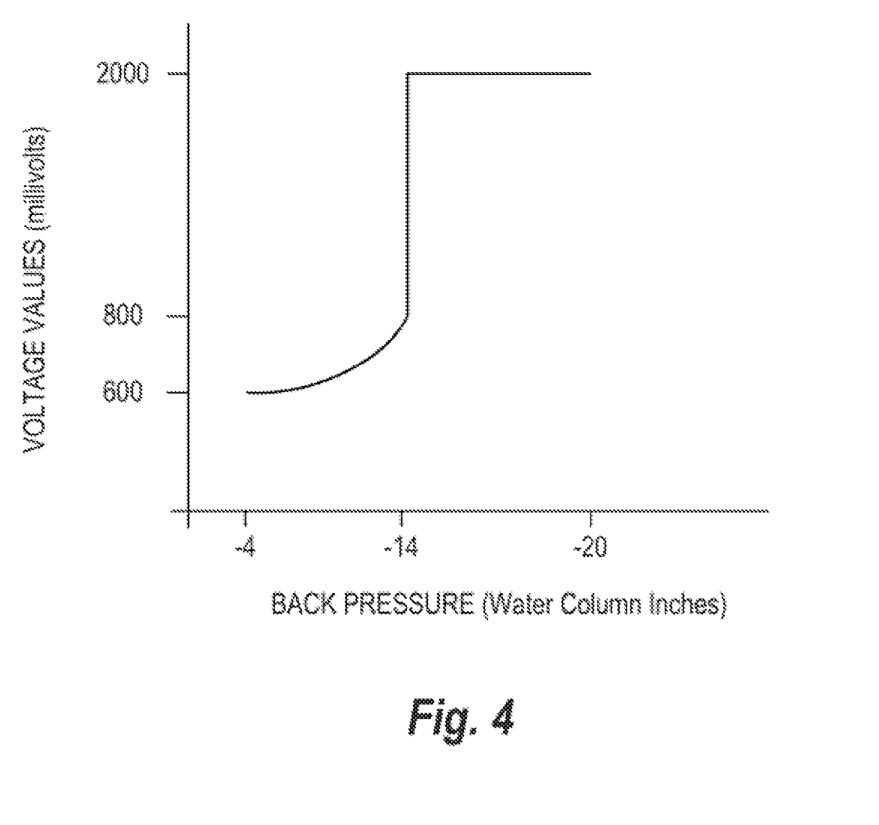
FIG. 4 is a chart diagram illustrating a relationship between voltage values output by a pressure sensor unit of the fluid ejection device of FIG. 1 and back pressure therein at a steady-state fluid level according to an example.

FIG. 4 is a chart diagram illustrating a relationship between voltage values output by a pressure sensor unit of the fluid ejection device of FIG. 1 and back pressure therein at a steady-state fluid level according to an example. The steady-state fluid level may be identified at a predetermined time period after a firing event of a respective ejection member 13. For example, the predetermined time period may be about one second. In some examples, voltage values output from a pressure sensor unit 15 may be a function of a back pressure within the at least one ejection chamber 11. Back pressure may be established within the fluid ejection device 100 to allow the fluid ejection device 100 to properly function. That is, back pressure may facilitate supplying fluid to the ejection chambers 11 while reducing drooling of the fluid through the nozzles 12. Pressure sensing events may occur with a change in pressure in the fluid ejection device 100, for example, due to spitting, printing or priming. That is, a meniscus of the fluid may move and change a cross-sectional area of fluid in at least the ejection chamber 11 between the sensor plate 15a and respective grounding member 22. In some examples, a change in the cross-sectional area of the fluid may correspond to a voltage output change and, for example, be measured as a resistance change. The back pressure may vary based on a fluid supply condition such as a pre-exhaustion condition.

Referring to FIG. 4, in some examples, the pressure sensor unit 15 having a sensor plate 15a may output voltage values corresponding to a back pressure in the respective ejection chamber 11. For example, the sensor plate 15a may be disposed in the respective ejection chamber 11. Referring to FIG. 4, for example, the voltage value output by the pressure sensor unit 15 may change in proportion to the change in back pressure with the back pressure range of approximately negative four inches of water (−4 Water Column Inches WCI)) to negative fourteen WCI. That is, for example, the back pressure range may correspond to the sensor plate 15a of the pressure sensor unit 15 being in contact with fluid and output a voltage value corresponding to a cross-sectional area of an amount of fluid in the respective ejection chamber 11. In some examples, the voltage value may also include a cross-sectional area of fluid in the channel 14 and/or fluid supply chamber 10. Accordingly, a supply condition may be more accurately determined at least due to the range of voltage values output by the pressure sensor unit 15 corresponding to the back pressure range. A maximum voltage value may be output by the sensor plate 15 of the pressure sensor unit 15 in response to lack of contact between the sensor plate 15a and the fluid.

FIG. 5 is a block diagram illustrating an inkjet printhead device according to an example. Referring to FIG. 5, in some examples, an inkjet printhead device 500 includes a fluid supply chamber 10, a plurality of ejection chambers 11, a channel 14, and an ABD MEMS pressure sensor 25. The channel 14 may establish fluid communication between the fluid supply chamber 10 and the ejection chambers 11. The fluid supply chamber 10 may store fluid. The plurality of ejection chambers 11 may include nozzles 12 and corresponding ejection members 13 to selectively eject the fluid through the respective nozzles 12. That is, fluid may be transported from the fluid supply chamber 10 to the ejection chambers 11. In some examples, at least one ejection chamber 11 may be a test chamber 11a, for example, having a nozzle 12a with a diameter greater in size than diameters of the nozzles 12 corresponding to the non-test ejection chambers. For example, the increased-size diameter of the respective nozzle 12a may reduce back pressure thereby. In some examples, the inkjet printhead device 500 may include a plurality of ABD MEMS pressure sensors 25 and each one having a respective sensor plate 25a. That is, the number of ABD MEMS pressure sensors 25 and the number of sensor plates 25a thereof may correspond to a number of test chambers 11a.

Referring to FIG. 5, in some examples, a respective sensor plate 25a may be disposed in a test chamber 11a to output a voltage value corresponding to a cross-sectional area of an amount of fluid in the test chamber 11a similar to as previously disclosed with respect to FIGS. 1-4. In some examples, the sensor plate 25a may be disposed in the respective 11, channel 14, or the like. For example, the sensor plate 25a may be disposed in the test chamber 11a. Alternatively, the inkjet printhead device 500 may include a single MEMS pressure sensor 25 including a plurality of sensor plates 25a corresponding to a number of test chambers 11a. In some examples, the inkjet printhead device 500 may also include a converter module 26, an ABD MEMS pressure sensor 25 to receive an electrical current signal, and respective sensor plates 25a to output respective voltage values corresponding to a back pressure as previously disclosed with reference to FIGS. 1 to 4.

Figure 6:
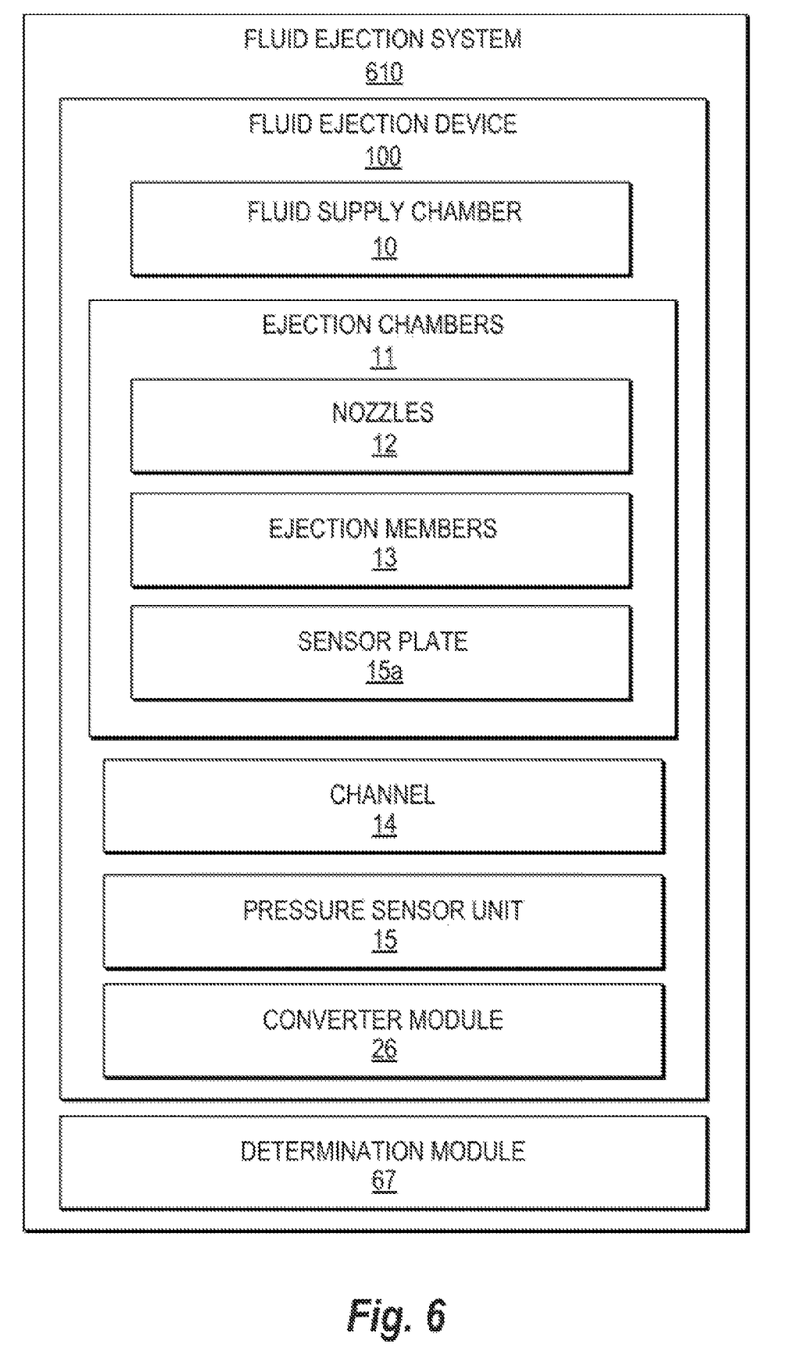
FIG. 6 is a block diagram illustrating a fluid ejection system according to an example.

FIG. 6 is a block diagram illustrating a fluid ejection system according to an example. Referring to FIG. 6, in some examples, a fluid ejection system 610 may include the fluid ejection device 100 as previously disclosed with respect to FIGS. 1-4. That is, the fluid ejection device 100 may include a fluid supply chamber 10, a plurality of ejection chambers 11, a channel 14, and a pressure sensor unit 15. In some examples, the pressure sensor unit 15 may be in a form of an ABD MEMS pressure sensor 25. The fluid supply chamber 10 may store fluid. The channel 14 may establish fluid communication between the fluid supply chamber 10 and the ejection chambers 11. For example, fluid may be transported from the fluid supply chamber 10 to the ejection chambers 11. The ejection chambers 11 may include nozzles 12 and corresponding ejection members 11 to selectively eject the fluid through the respective nozzles 12.

Referring to FIG. 6, the pressure sensor unit 15 may include a sensor plate 15a to output a voltage value corresponding to a cross-sectional area of an amount of fluid in the at least one ejection chamber 11. For example, the voltage value output from the pressure sensor unit 15 may be a function of a back pressure within the at least one ejection chamber 11. In some examples, the sensor plate 15a may be disposed in the at least one ejection chamber 11, channel 14, or the like. For example, the sensor plate 15a may be disposed in a respective ejection chamber 11. The fluid ejection system 610 may also include a converter module 26 and a determination module 67. The converter module 26 may output a count value corresponding to the voltage value output by the pressure sensor unit 15. The determination module 67 may determine at least one supply condition based on the count value output by the converter module 26. In some examples, the determination may be used to inform the fluid ejection system 610 and/or user of the respective supply condition of the fluid ejection system 610.

Figure 7:
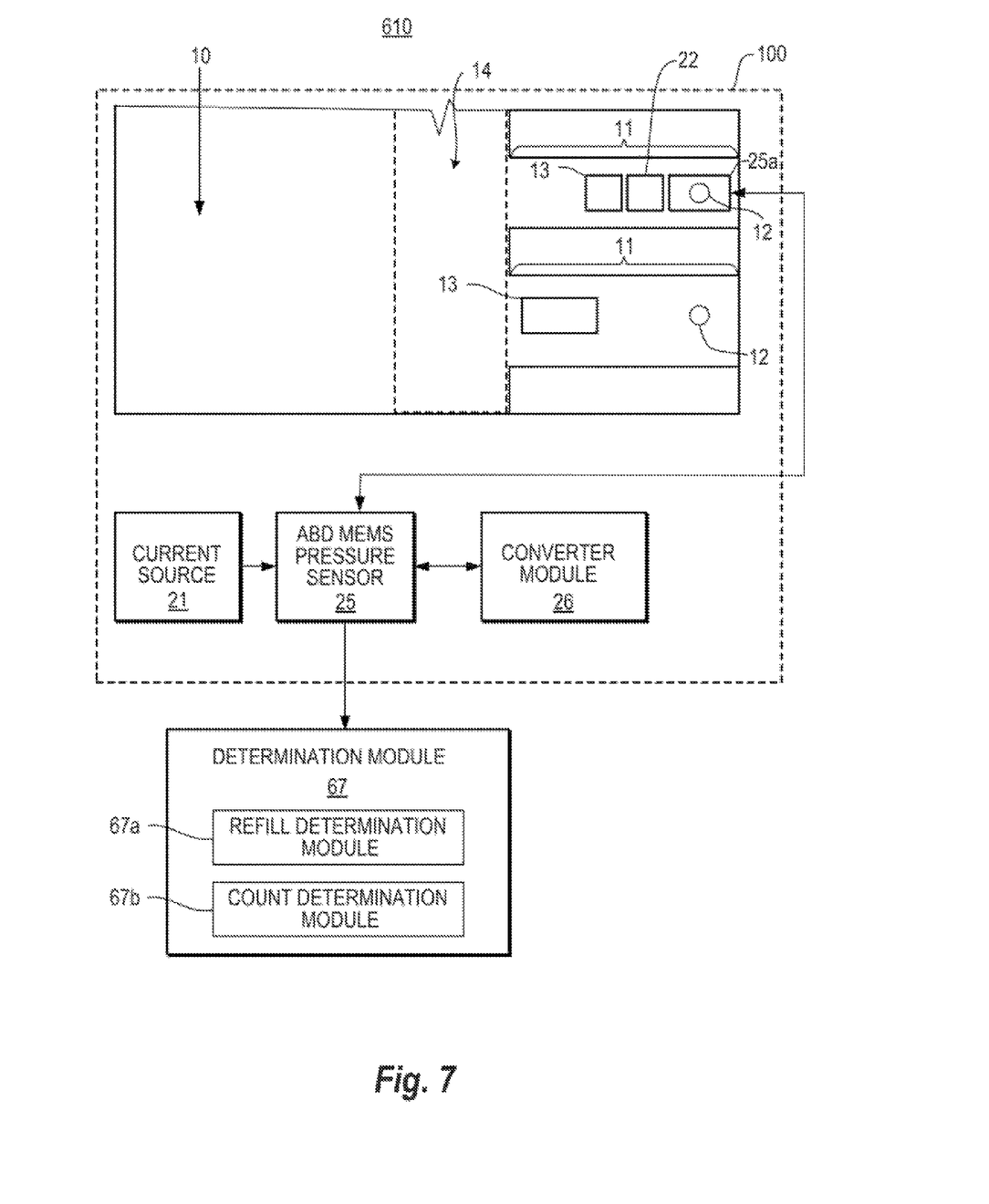
FIG. 7 is a schematic top view illustrating a portion of the fluid ejection system of FIG. 6 according to an example.

FIG. 7 is a schematic top view of a portion of the fluid ejection system of FIG. 6 according to an example. Referring to FIG. 7 in some examples, the fluid ejection system 610 may include the fluid ejection device 100 as previously disclosed with respect to FIG. 6. That is, the fluid ejection system 610 may include a fluid supply chamber 10, a plurality of ejection chambers 11, a channel 14, a pressure sensor unit 15, and a converter module 26. The fluid ejection system 610 may also include a current source 21 and a determination module 67. The current source 21 may supply an electrical current signal to the pressure sensor unit 15. The determination module 67 may include a refill determination module 67a and a count determination module 67b.

Referring to FIG. 7, the refill determination module 67a may determine an amount of time to refill the at least one ejection chamber 11 with the fluid from the fluid supply chamber 10. For example, the pressure sensor unit 15 may periodically detect the presence of and/or absence of fluid at a predetermined location over a predetermined time period through the respective sensor plate 15a. The refill determination module 67a may determine an amount of time such as a time period and/or a rate in which the respective ejection chamber 11 is refilled, for example, based on periodic detections by the pressure sensor unit 15. The count determination module 67b may determine a supply condition based on the count value output by the converter module 26 and the amount of time to refill the at least one ejection chamber 11 determined by the refill determination module 67a. The fluid ejection system 610 may be in a form of an image forming system such as an inkjet printing system, or the like. The fluid ejection device 100 may be in a form of an inkjet printhead device, or the like. Additionally, the fluid may be in a form of ink, or the like.

In some examples, the supply condition may include a pre-exhaustion condition. Such conditions may be determined by changes in a position of the fluid within the ejection chamber 11 and/or channel 14 with respect to time. The pre-exhaustion condition may correspond to fluid in the fluid supply chamber nearing running out. That is, the pre-exhaustion condition may be an early indication that the fluid ejection system 610 is approaching an out of fluid condition. For example, back pressure and refill time steadily increase as fluid in the fluid supply chamber 10 is running out. Consequently, less amount of fluid may be in the ejection chamber 11 at a predetermined time after a firing of the respective ejection member 13 due to the pre-exhaustion condition than in response to a normal supply condition. Accordingly, the pressure sensor unit 15 may detect refill time and the amount of fluid in ejection chamber 11 with respect to a predetermined time over successive firing cycles.

A count value determined by the converter module 26 and/or voltage value output by sensor plate 15a may be higher due to the pre-exhaustion condition than in response to the normal supply condition. The pre-exhaustion condition, for example, may be determined by the count determination module 67b when the count value is at least one of equal to and greater than the threshold value and the amount of time to refill the at least one ejection chamber 11 is at least one of equal to and greater than a threshold parameter. In some examples, the amount of time to refill the respective ejection chamber 11 may correspond to a refill rate. In some examples, the threshold value may be a predetermined amount and/or rate of time in which amounts and/or rates less than the threshold parameter may correspond to the non-existence of a pre-exhaustion condition and amounts and/or rates greater than the threshold parameter may correspond to the existence of the pre-exhaustion condition.

Figure 8:
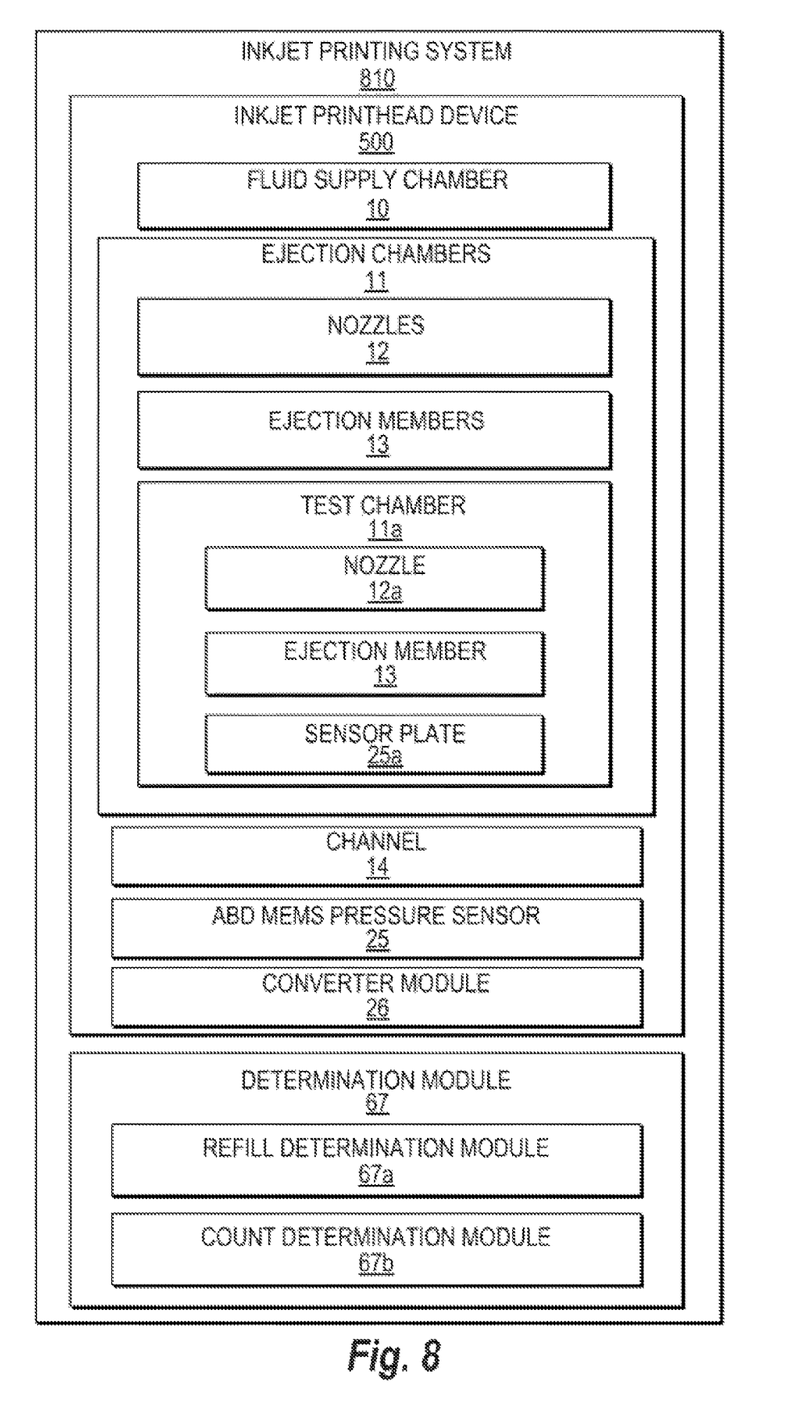
FIG. 8 is a block diagram illustrating an inkjet printing system according to an example.

FIG. 8 is a block diagram illustrating an inkjet printing system according to an example. Referring to FIG. 8, in some examples, an inkjet printing system 810 may include the inkjet printhead device 500 including a fluid supply chamber 10, a plurality of ejection chambers 11, a channel 14, ABD MEMS pressure sensor 25, and a converter module 26 as previously disclosed with respect to FIG. 5. In some examples, at least one ejection chamber 11 may be a test chamber 11a, for example, having a nozzle 12a with a diameter greater in size than diameters of the nozzles 12 corresponding to the non-test ejection chambers. In some examples, the ABD MEMS pressure sensor 25 may include a sensor plate 25a disposed in test chamber 11. Alternatively, in some examples, the sensor plate 25a may be disposed in a channel 14, fluid chamber 10, or the like. In some examples, the inkjet printing system 810 may include a plurality of ABD MEMS pressure sensors 25 including sensor plates 25a, for example, corresponding to a plurality of test chambers 11a. The respective sensor plates 25a may output a voltage value corresponding to a cross-sectional area of an amount of fluid in the respective test chamber 11a. For example, the voltage value output from the ABD pressure sensor 25 unit may be a function of a back pressure within the respective test chamber 11a.

Referring to FIG. 8, in some examples, the inkjet printing system 810 may also include a determination module 67. That is, the determination module 67 may include a refill determination module 67a and a count determination module 67b to determine a supply condition based on the count value output by the converter module 26 and the amount of time to refill the respective ejection chamber 11a determined by the refill determination module 67a. In some examples, the supply condition may include the pre-exhaustion condition as previously disclosed with respect to the fluid ejection system 610 illustrated in FIGS. 6-7.

In some examples, the pressure sensor unit 15, converter module 26, determination module 67, refit determination module 67a and/or count determination module 67b may be implemented in hardware, software, or in a combination of hardware and software. In some examples, the pressure sensor unit 15, converter module 26, determination module 67, refill determination module 67a and/or count determination module 67b may be implemented in part as a computer program such as a set of machine-readable instructions stored in the fluid ejection device 100, inkjet printhead device 500, fluid ejection system 610, and/or inkjet printing system 810 locally or remotely. For example, the computer program may be stored in a memory such as a server or a host computing device.

Figure 9:
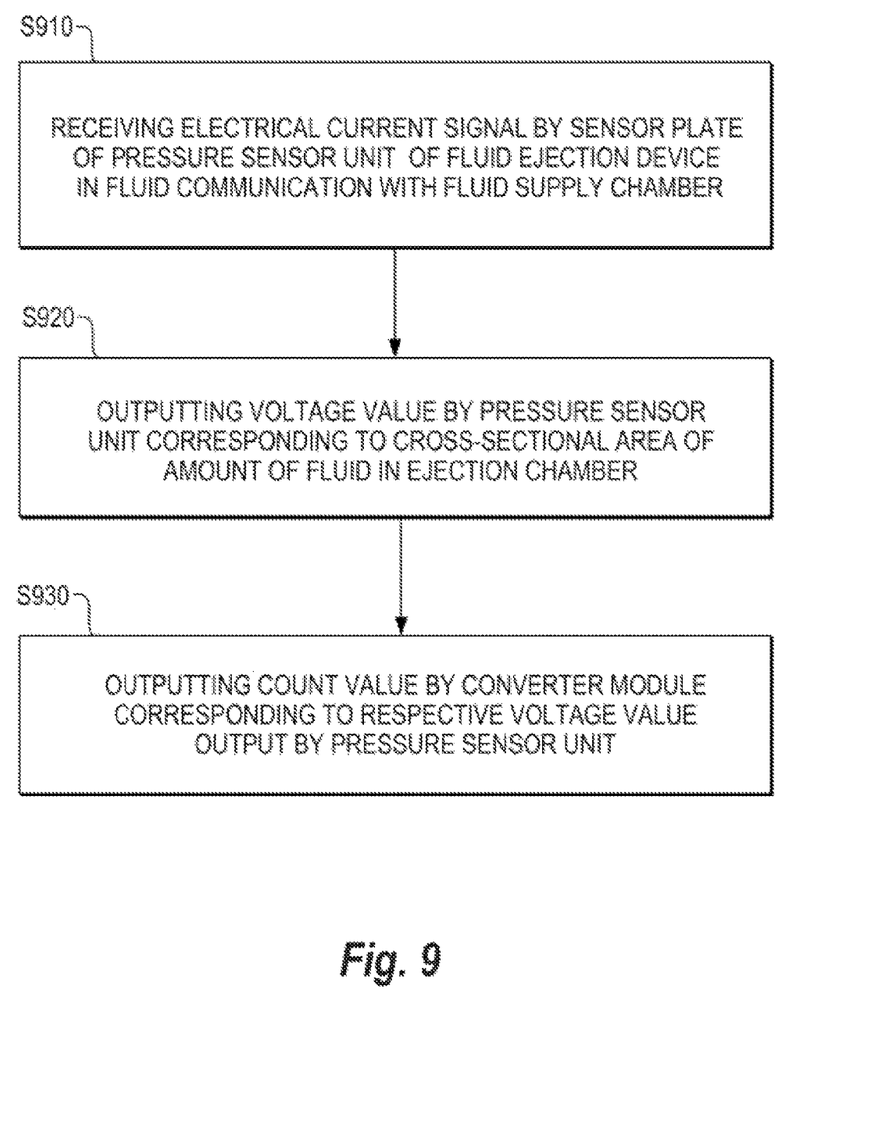
FIG. 9 is a flowchart illustrating a method of outputting a count value corresponding to an amount of fluid in a fluid ejection device according to an example.

FIG. 9 is a flowchart illustrating a method of outputting a count value corresponding to an amount of fluid in a fluid ejection device according to an example. Referring to FIG. 9, in block S910, an electrical current signal is received by a sensor plate of a pressure sensor unit of the fluid ejection device in fluid communication with a fluid supply chamber. For example, the sensor plate may be disposed in the ejection chamber. In block S920, a voltage value is output by a pressure sensor unit corresponding to a cross-sectional area of the amount of fluid in the ejection chamber. For example, the electrical current signal may be transmitted to a grounding member through fluid in contact with and disposed between the sensor plate and the grounding member. In some examples, the grounding member may be disposed in the ejection chamber. The respective voltage value output on the sensor plate of the pressure sensor unit may correspond to the cross-sectional area of the amount of fluid in the ejection chamber as a function of a back pressure within the ejection chamber. In block S930, a count value is output by a converter module corresponding to the respective voltage value output by the pressure sensor unit. The pressure sensor unit may be in a form of an ABD MEMS pressure sensor. In some examples, the method may also include a plurality of ejection chambers including a plurality of nozzles and a plurality of ejection members to selectively eject fluid through the nozzles, respectively.

Figure 10:
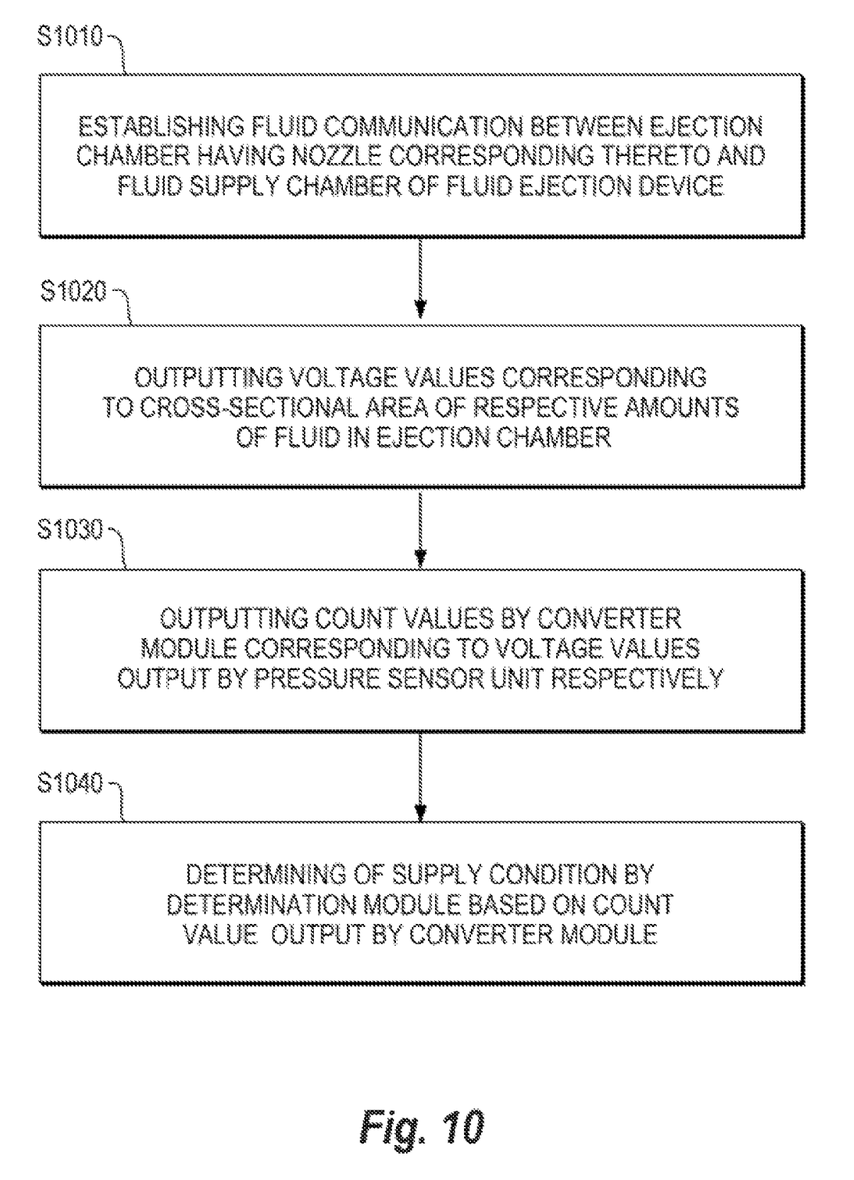
FIG. 10 is a flowchart illustrating a method of determining a supply condition of as fluid ejection system according to an example.

FIG. 10 is a flowchart illustrating a method of determining a supply condition of a fluid ejection system according to an example. Referring to FIG. 10, in block S1010, fluid communication is established between an ejection chamber having a nozzle corresponding thereto and a fluid supply chamber of a fluid ejection device. For example, the fluid communication may be established through a channel. In block S1020, voltage values corresponding to a cross-sectional area of an amount of fluid in an ejection chamber are output by a pressure sensor unit having a sensor plate. In some examples, the sensor plate may be disposed in the ejection chamber, channel, fluid chamber, or the like. In some examples, the pressure sensor unit may be in a form of an ABD MEMS pressure sensor. The voltage value output from the pressure sensor unit may be a function of a back pressure within the at least ejection chamber. In block S1030, count values are output by a converter module corresponding to the voltage values output by the pressure sensor unit, respectively.

In block S1040, the supply condition may be determined by a determination module based on the count values output by the converter module, respectively. For example, the supply condition may be determined by a count determination module based on the count values output by the converter module and the amount of time to refill the ejection chamber may be determined by the refill determination module. In some examples, the supply condition may include the pre-exhaustion condition as previously disclosed with respect to the fluid ejection system illustrated in FIGS. 6-7.

It is to be understood that the flowcharts of FIGS. 9 and 10 illustrate an architecture, functionality, and operation of examples of the present disclosure. If embodied in software, each block may represent a module, segment, or portion of code that includes one or more executable instructions to implement the specified logical function(s). If embodied in hardware, each block may represent a circuit or a number of interconnected circuits to implement the specified logical function(s). Although the flowcharts of FIGS. 9 and 10 illustrate a specific order of execution, the order of execution may differ from that which is depicted. For example, the order of execution of two or more blocks may be scrambled relative to the order illustrated. Also, two or more blocks illustrated in succession in FIGS. 9 and 10 may be executed concurrently or with partial concurrence. All such variations are within the scope of the present disclosure.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure, and/or claims, "including but not necessarily limited to."

It is noted that some of the above described examples may include structure, acts or details of structures and acts that may not be essential to the present disclosure and are intended to be exemplary. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. A fluid ejection device, comprising:
a fluid supply chamber to store fluid;
a plurality of ejection chambers comprising nozzles and corresponding ejection members to selectively eject the fluid through the respective nozzles;
a channel to establish fluid communication between the fluid supply chamber and the ejection chambers; and
a pressure sensor unit having a sensor plate, the sensor plate to output a voltage value corresponding to a cross-sectional area of an amount of fluid in at least one ejection chamber, wherein a diameter of a respective nozzle corresponding to the at least one ejection chamber is greater than diameters of respective nozzles corresponding to respective ejection chambers other than the at least one ejection chamber.

2. The fluid ejection device according to claim 1, wherein the pressure sensor unit further comprises:
an air bubble detect micro-electro-mechanical systems (ABD MEMS) pressure sensor.

3. The fluid ejection device according to claim 1, wherein the voltage value output from the pressure sensor unit is a function of a back pressure within the at least one ejection chamber.

4. The fluid ejection device according to claim 1, further comprising:
a grounding member disposed in the at least one ejection chamber; and
a current source to transmit an electrical current signal to the grounding member through fluid in contact with and disposed between the respective sensor plate and the grounding member.

5. The fluid ejection device according to claim 4, wherein grounding member is disposed between the ejection member and the sensor plate.

6. The fluid ejection device according to claim 1, further comprising:
a converter module to output a count value corresponding to the respective voltage value or the fluid output by the pressure sensor unit.

7. The fluid ejection device according to claim 6, wherein the sensor plate is disposed in at least one of the ejection chambers.

8. The fluid ejection device according to claim 1, wherein the ejection members are resistors.

9. The fluid ejection device according to claim 1, wherein the sensor plate and a nearest ejection member are not located on facing surfaces.

10. The fluid ejection device according to claim 1, wherein the sensor plate and the ejection member are located on a common surface.

11. The fluid ejection device according to claim 1, wherein an axis centered along a bore of a nozzle nearest the sensor plate intersects the sensor plate.

12. An inkjet printhead device, comprising:
a fluid supply chamber to store fluid;
a plurality of ejection chambers comprising nozzles and corresponding ejection members to selectively eject the fluid through the respective nozzles, at least one of the ejection chambers corresponds to a test chamber;
a channel to establish fluid communication between the fluid supply chamber and the ejection chambers; and
an air bubble detect micro-electro-mechanical systems (ABD MEMS) pressure sensor having a respective sensor plate disposed in the test chamber, the sensor plate to output a voltage value corresponding to a cross-sectional area of an amount of fluid in the test chamber, wherein the ABD MEMS detects bubbles by a change in current flowing through the plate of the pressure sensor and adjacent fluid.

13. The inkjet printhead device according to claim 12, further comprising:
a converter module to output a count value corresponding to the respective voltage value output by the respective ABD hi EMS pressure sensor.

14. The inkjet printhead device according to claim 12, further comprising:
a grounding member disposed in the respective ejection chamber; and
a current source to transmit an electrical current signal to the grounding member through fluid in contact with and disposed between the respective sensor plate and the grounding member.

15. The inkjet printhead device according to claim 12, wherein the voltage value output from the respective sensor plate of the ABD MEMS pressure sensor is a function of a back pressure within the respective ejection chamber.

16. The inkjet printhead device according to claim 12, wherein a diameter of a respective nozzle corresponding to the test chamber is greater than diameters of respective nozzles corresponding to the ejection chambers other than the test chamber.

* * * * *